(No Model.)
J. A. ROBSON.
DRAFT SPRING FOR VEHICLES.
No. 408,437. Patented Aug. 6, 1889.
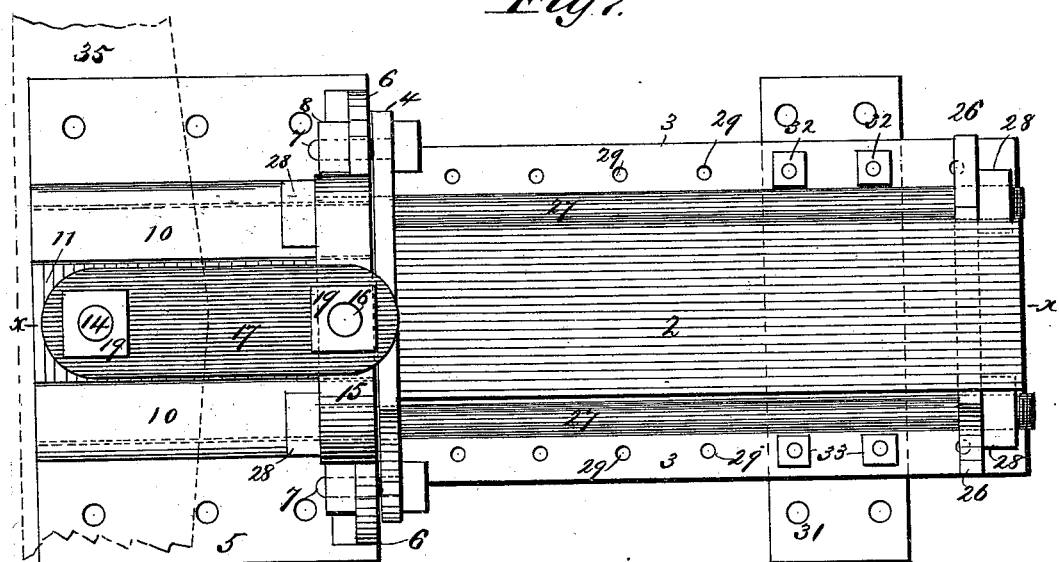
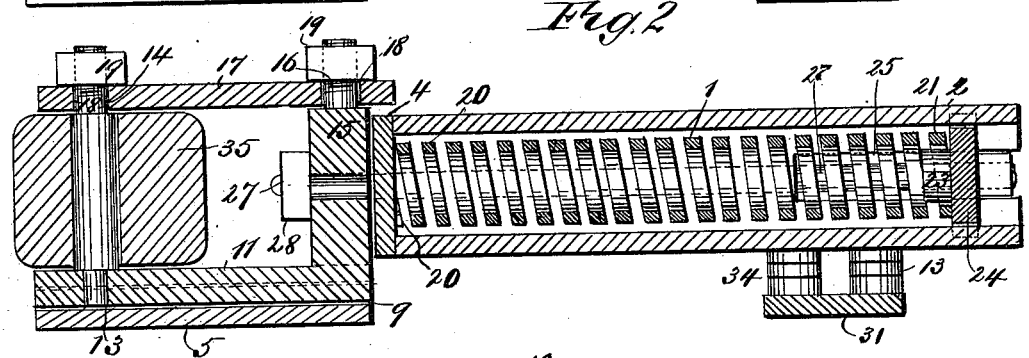
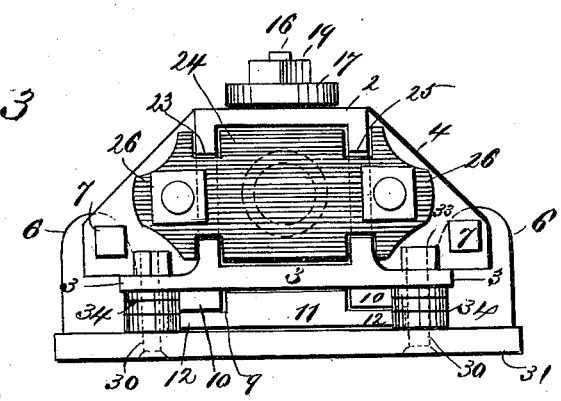
WITNESSES:
INVENTOR:
J. A. Robson
BY Munn & Co.
ATTORNEYS.

UNITED STATES PATENT OFFICE.

JAMES A. ROBSON, OF NEW YORK, N. Y.

DRAFT-SPRING FOR VEHICLES.

SPECIFICATION forming part of Letters Patent No. 408,437, dated August 6, 1889.

Application filed November 24, 1888. Serial No. 291,766. (No model.)

*To all whom it may concern:*

Be it known that I, JAMES A. ROBSON, of the city, county, and State of New York, have invented a new and Improved Draft-Spring Attachment for Vehicles, of which the following is a full, clear, and exact description.

This invention relates to draft-spring attachments for vehicles, and has for its object to provide a draft-spring attachment for vehicles which can be easily attached to all vehicles and will be effective and durable.

The invention consists in a draft-spring attachment for vehicles constructed and arranged as hereinafter described and claimed.

Reference is to be had to the accompanying drawings, forming a part of this specification, in which similar figures of reference indicate corresponding parts in all the views.

Figure 1 is a plan view of the invention. Fig. 2 is a longitudinal section on the line $x$ $x$, Fig. 1; and Fig. 3 is an end view.

In the construction of this invention a preferably coiled spring 1 is located in a casing 2, formed with lateral flanges 3 and a transverse plate 4 at its forward end. A horizontal plate 5, formed with vertical lugs 6 on its rear edge, is connected to casing 2 by bolts 7 passing through bolt-holes in plate 4 and lugs 6 and secured by nuts 8.

The plate 5 may be made in various widths, and a plate 5 of the required width is taken, holes are drilled therein, and the plate bolted to the hounds, tongue, or pair of shafts of a vehicle.

The plate 5 is formed with longitudinal under-cut ribs 10, forming a central recess 9, and in the recess 9 is located a sliding plate 11, having lateral flanges 12. The sliding plate 11 is provided with a vertical bolt 13 at its forward end, having a diminished screw-threaded upper end 14, and a vertical plate 15 at its rear end, located between lugs 6, and having a screw-threaded stud 16 at its top. The bolt 13 is connected with plate 15 by a plate 17 engaging the end 14 and the stud 16 by means of bolt-holes 18, and secured by nuts 19 engaging the end 14 and stud 16. If preferred, the plate 5 and casing 2 may be formed in one piece. Owing to some constructions of vehicles, however, it will be necessary to have the plate 5 and casing 2 formed in two parts, as heretofore described.

The coiled spring 1 has one end 20 bearing against the plate 4 at the forward end of casing 2, and its other end 21 engaging a projection 23 on a sliding plate 24, which extends across the interior of casing 2, and has lateral projections extending through slots 25 in the sides of the casing and terminating in enlargements 26. The plate 24 may be connected with the sliding plate 11 to move with the latter by rods variously arranged, and, as here shown, by means of rods 27, extending through the enlargements 26 alongside of casing 2 and through the vertical plate 15 on the plate 11, the rods 27 being secured in place by nuts 28 on their ends. A third rod may be used, passing through the coiled spring. By this means the compression and torsion of the spring are regulated as the the draft on the attachment affects the spring.

The attachment hereinbefore described may be secured to the hounds, tongue, or pole, or pair of shafts of a vehicle, preferably, by means of the following construction of parts: The flanges 3 are provided with bolt-holes 29 an equal distance apart, which correspond with bolt-holes 30 in a cross-plate 31 of the required length, any two of the bolt-holes 29 in flanges 3 coinciding with two bolt-holes 30. The plate 31 may be secured to the desired portion of the vehicle in adjusted position on the flanges 3 of casing 2 by means of bolts 32, having their heads countersunk in the under side of plate 31, passing through the holes 29 and 30, and secured at their upper ends by nuts 33. To also enable the plate 31 to be properly attached in position, washers 34 in any number are preferably inserted between plate 31 and flanges 3, but may be omitted, as occasion demands. The plate 31 is secured by drilling it with holes and bolting it to the hounds, pole, or pair of shafts. When in use with a whiffletree 35, attached to bolt 13, which is readily done by removing nuts 19 and plate 17 and securing the whiffletree 35 to bolt 13, it will be seen that the draft will be on the coiled spring 1, the plate 11 moving forward on the plate 5, according to the movement of the whiffletree and spring 1. By means of this draft-spring attachment many advantages will be afforded—as, for example, in starting a heavy load the power of the animal or animals pulling will be gradually applied until the resistance of the load is overcome. Where more than one horse is harnessed to the vehicle the balking, jerking, and straining of the animals and danger of breaking the whiffletree are avoided when a portion of the team starts and pulls before the others. The animals are also relieved from sudden jar and strain arising from the unevenness of the road. Lastly, the draft attachment may be readily secured to any vehicle, and will be effective and durable.

While I have set forth a specific construction of parts, I do not intend to limit myself thereto, as they may be varied without departing from the essential features of the invention.

Having thus described my invention, what I claim as new, and desire to secure by Letters Patent, is—

1. A draft-spring attachment for vehicles, comprising a support, a sliding plate mounted in said support and adapted to carry a whiffletree, a casing projecting from the support, a spring in said casing, a sliding plate in the casing and against which one end of the spring rests, and a connection between the sliding plate carrying the whiffletree and the sliding plate in the casing, substantially as described.

2. In a draft-spring attachment for vehicles, the combination, with a recessed support and a slotted casing secured to the said support, of a sliding whiffletree-carrying plate in the support, a spring arranged in the casing, a sliding plate provided with projections extending through the slots of the casing, and rods secured to the projections of the said sliding plate and to the sliding plate in the support and carrying the whiffletree, substantially as herein shown and described.

3. In a draft-spring attachment for vehicles, the combination, with a recessed support, of a sliding plate in said support and provided with a bolt at its forward end and with a vertical plate at its rear end, and having at its top a stud and a plate secured to the said bolt and stud, substantially as described.

4. A draft-spring attachment for vehicles, consisting of plate 5, having vertical lugs 6 and ribs 10, forming recess 9, a sliding plate 11, located in recess 9, a vertical bolt 13 on the forward part of plate 11, and a vertical plate 15 on the rear end, with a screw-threaded stud 16, a plate 17, engaging bolt 13 and stud 16 and secured by nuts 19, a casing 2, with transverse plate 4 at its forward end bolted to lugs 6, lateral openings 25 at its rear end and lateral horizontal flanges 3, with bolt-holes 29, a coiled spring 1, located in casing 2, and a sliding plate 24, extending laterally through openings 25 and having a projection 23 engaging the end of spring 1, rods 27, secured at one end to plate 24 and at the other projecting through plates 4 and 15 and secured to the latter, and a plate 31 transverse to and adjustable on casing 2 and secured thereto by bolts 32 passing through holes 29 in flanges 3 and holes 30 in plate 31 and held by nuts 33, substantially as shown and described.

JAMES A. ROBSON.

Witnesses:
EDWARD W. CADY,
EDGAR TATE.